United States Patent
Libman et al.

(10) Patent No.: US 10,180,683 B1
(45) Date of Patent: Jan. 15, 2019

(54) ROBOTIC PLATFORM CONFIGURED TO IDENTIFY OBSTACLES AND FOLLOW A USER DEVICE

(71) Applicant: FELLOW ROBOTICS LTD., Jerusalem (IL)

(72) Inventors: Alex Libman, Jerusalem (IL); Liat Ackerman, Netanya (IL); Amir Ben Shalom, Jerusalem (IL)

(73) Assignee: Fellow Robotics Ltd., Jerusalem (IL)

( * ) Notice: Subject to any disclaimer, the term of this patent is extended or adjusted under 35 U.S.C. 154(b) by 0 days.

(21) Appl. No.: 15/338,623

(22) Filed: Oct. 31, 2016

Related U.S. Application Data

(60) Provisional application No. 62/248,274, filed on Oct. 29, 2015.

(51) Int. Cl.
  *G05D 1/00* (2006.01)
  *G05D 1/02* (2006.01)

(52) U.S. Cl.
  CPC ........... *G05D 1/0088* (2013.01); *G05D 1/028* (2013.01); *G05D 1/0214* (2013.01)

(58) Field of Classification Search
  CPC ..... G05D 1/0088; G05D 1/0214; G05D 1/028
  See application file for complete search history.

(56) References Cited

U.S. PATENT DOCUMENTS

| | | | | |
|---|---|---|---|---|
| 5,323,470 A | * | 6/1994 | Kara | B25J 9/1697 348/169 |
| 8,634,981 B1 | * | 1/2014 | Hyde | A61G 1/0275 180/19.1 |
| 2002/0153184 A1 | * | 10/2002 | Song | A47L 9/009 180/167 |
| 2011/0172850 A1 | * | 7/2011 | Paz-Meidan | B25J 5/00 701/2 |
| 2015/0094879 A1 | * | 4/2015 | Pari | G05D 1/0276 701/2 |
| 2015/0190927 A1 | * | 7/2015 | Sutherland | B25J 9/1689 700/259 |

\* cited by examiner

*Primary Examiner* — Richard M Camby
(74) *Attorney, Agent, or Firm* — FisherBroyles, LLP; Ariel Reinitz

(57) ABSTRACT

A robotic platform configured to identify obstacles and follow a user and/or a user device. In one implementation, a processing device receives one or more sensor inputs, processes the one or more sensor inputs to identify an obstacle within a navigation path, the navigation path corresponding to a robotic platform following a user device, computes an alternate route in view of the navigation path and the identification of the obstacle, and configures the robotic platform to follow the user device based on the alternate route.

19 Claims, 11 Drawing Sheets

ROBOTIC PLATFORM CONFIGURED TO IDENTIFY OBSTACLES AND FOLLOW A USER DEVICE

CROSS-REFERENCE TO RELATED APPLICATIONS

This application is related to and claims the benefit of U.S. Patent Application No. 62/248,274, filed Oct. 29, 2015 which is incorporated herein by reference in its entirety.

TECHNICAL FIELD

Aspects and implementations of the present disclosure relate to data processing, and more specifically, to a robotic platform configured to identify obstacles and follow a user device.

BACKGROUND

Various products, such as luggage, incorporate elements such as wheels to enable them to be transported more easily from place to place.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In one aspect of the present disclosure, a processing device receives one or more sensor inputs. The processing device processes the one or more sensor inputs to identify an obstacle within a navigation path, the navigation path corresponding to a robotic platform following a user device. The processing device computes an alternate route in view of the navigation path and the identification of the obstacle. The processing device configures the robotic platform to follow the user device based on the alternate route.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to a robotic platform configured to identify obstacles, track the location of a user and/or a user device, and follow the user and/or the user device.

Described herein are technologies including robotic platforms and applications that can enable various objects to track and/or follow a device and/or a user (including avoiding various obstacles that may be present) and communicate/interface with various device(s). In various implementations, the described technologies can enable functional robots that will perform various actions (as described herein) and interface/communicate with users and/or their environment. It should be understood that, in certain implementations, the referenced robotic platform can be a component (or system of components) that is integrated within and/or attached to an item (e.g., a suitcase, a shopping cart, etc.) and which may be capable of and/or configured to physically maneuver such an item (e.g., by rolling on wheels), such as in a manner described herein.

The described technologies can include an application or 'app' that can be installed on a user's device (e.g., a smartphone, tablet, smartwatch etc.) and that can enable and/or facilitate various aspects described herein. For example, in certain implementations the user can request and/or receive data (such as: battery life, location, pictures, weight and more) from an associated object and/or its integrated robotic platform. In certain implementations, such data can be transmitted/received via various interfaces and/or protocols, including but not limited to BLE, Zigbee, Wifi communication, etc., and/or wired communication. The referenced app (which can execute on a device associated with a user) can also enable the user to turn a "Follow me" function on\off and/or to configure various other aspects of the operation of the robotic platform.

Figure 1:
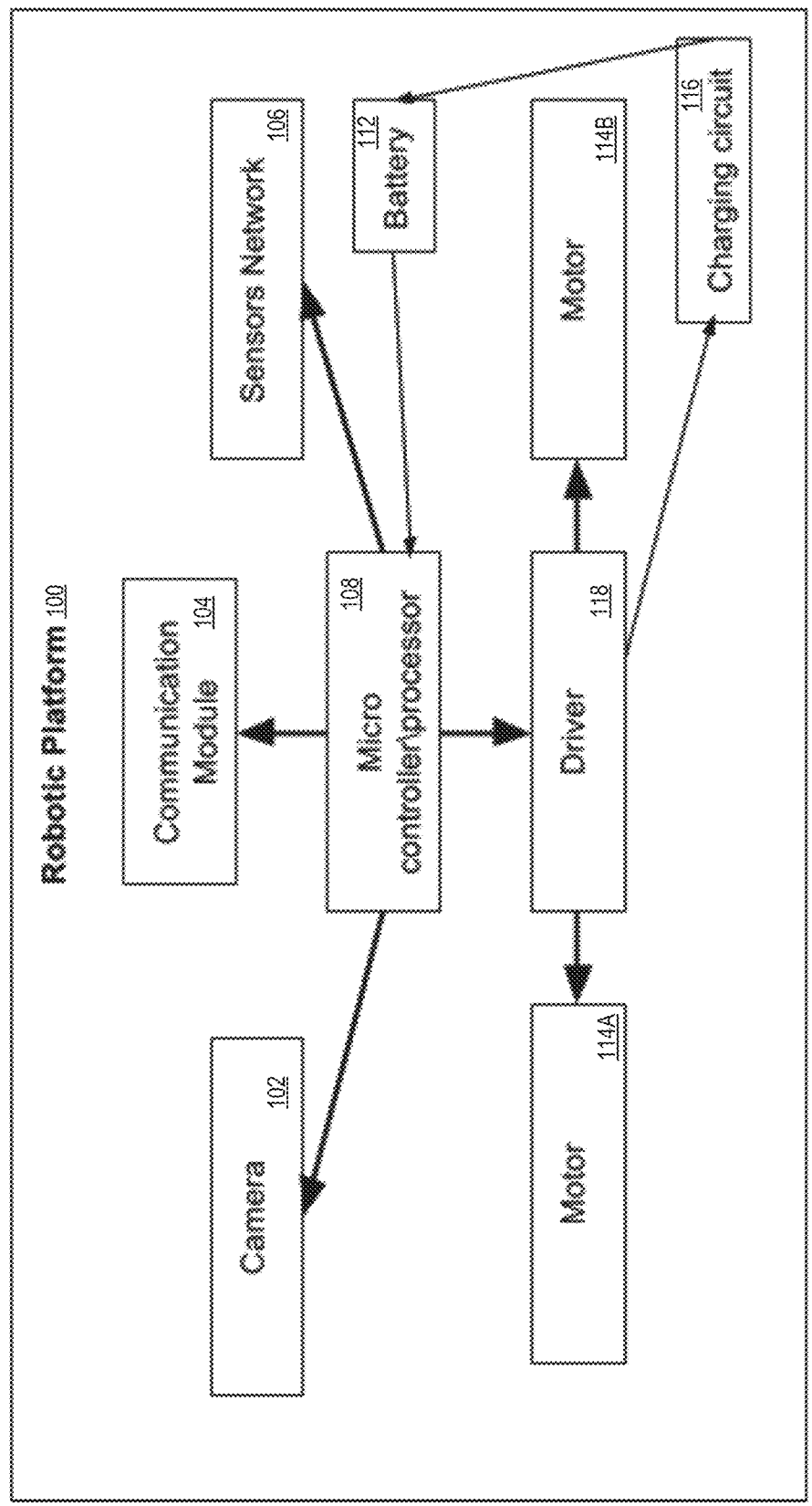
FIG. 1 depicts a schematic diagram of an exemplary robotic platform, in accordance with one implementation of the present disclosure.

In certain implementations, when the robotic platform is activated, various sensors (e.g., infrared (IR), ultrasonic, camera etc.) that are integrated within the referenced platform can be configured to scan the periphery of the platform and/or the periphery of the object (e.g., a suitcase) with respect to which the platform is integrated in order to identify various obstacles that may be present, e.g., in front of and/or in the path of the object/platform. For example, in certain implementations infrared signals, ultrasonic signals, etc. can be broadcast/transmitted and then received (e.g., by the integrated sensors). Upon detecting the presence of an obstacle using the referenced technique, the platform can be configured to then initiate and/or utilize various computer vision techniques and/or visual sensors (or both) in order to further identify and avoid the referenced obstacle. For example, as shown in FIG. 1, a camera 102 (which may be integrated within the robotic platform 100, as described herein) can be activated and can begin to capture images, video, etc. The captured images can then be processed in order to identify/define the obstacles present in the captured image(s) by width. This can be achieved, for example, by sampling a pixel's area that was detected/identified (e.g., by the referenced sensors) as an obstacle. In certain implementations, an "image growing" technique can be used to detect pixels in a captured image that correspond to identified obstacle by separating them from the background pixels and/or from other objects and further searching for pixels around the detected area having similar characteristics as the identified obstacle. Upon identifying such pixels (having similar characteristics as the pixels determined to be associated with the obstacle), the area identified as an obstacle within the image can be increased/grow accordingly. Upon determining that there are no more similar pixels within the captured image(s), the width (e.g., in pixels) of the identified obstacle(s) can be output. Alternatively, the identified pixels can be transferred/converted to a standard metric (e.g., inch\cm etc.) in order to determine the obstacle's width. Having identified the presence and/or size/scope of an obstacle, the robotic platform (and/or another device) can compute one or more routes (e.g., an optimal, most efficient, etc., route) to avoid the obstacle, such as by calculating the angle at which the platform and/or associated object should turn in order to avoid the obstacle (e.g., when 'following' a user and/or device).

Additionally, in certain implementations, data received from the various sensors (e.g., accelerometers, gyroscopes, tilt, etc.) integrated within an associated user device (e.g., a smartphone, smartwatch, tablet, wearable device, etc.) can be provided to and/or processed in conjunction with the robotic platform in order to calculate (based on, for example, the sensor data originating at the user's smartphone and sensor data originating at the robotic platform) the angle of the position of the user device (smartphone, tablet, smartwatch, etc.) in relation to the robotic platform. For example, in certain implementations the referenced determination can adjust various aspects of the operation of the robotic platform in order to ensure that the associated object (e.g., a suitcase) and the user device (e.g., smartphone) remain oriented at a specific ratio in relation to one another while the robotic platform is 'following' the user (e.g., while walking). By way of further example, in order to adjust the speed of the object (e.g., a suitcase), inputs originating at the sensors of the user device and/or the robotic platform can be processed, e.g., using various computer vision/machine learning techniques, such as in order to locate the user. For example, the referenced inputs can be processed in order to compute/approximate the user's distance (e.g., from the object/robotic platform) based on one or more parameters (and/or relationships between them) including but not limited to walking speed and the size of the user as determined based on an analysis of image(s) captured by the robotic platform. By using techniques such as pulse—width modulation (PWM), the speed of the object can be adjusted according to the received data from the user's device (which can reflect the current speed at which the user is walking). In doing so, the distance between the object/robotic platform and the user it is following can be maintained, despite changes in the pace at which the user is walking.

In certain implementations, various machine learning techniques, the object/robotic platform can determine the relative (and/or absolute) location of the user and, based on such determination, the object/platform can be repositioned to any point around the user (if necessary).

In certain implementations it can be advantageous to determine/anticipate when the user is likely to stop walking (or slow down), for example in order to adjust the speed of the robotics platform/object and enable it to stop on time (and safely). Accordingly, in certain implementations the referenced app (which may execute at the user device) can be configured to recognize, determine, and/or count the steps of the user, such as based on inputs/data from the user device's sensors. Such data can be processed at the user device and/or transmitted/communicated to the robotics platform and can be further processed/interpreted (e.g., by the robotic platform) to determine a motion of the user according to the steps counted (e.g., over a period of time). Such a technique can be further enhanced by accounting for the data (e.g., images and/or various items identified within them) that is received with respect to the referenced computer vision techniques. In doing so, the motion of the user can be accurately determined and the speed of the robotic platform/object can be adjusted accordingly.

The described functionalities can enable the object/robotic platform to follow the user closely and accurately while avoiding obstacles that are on the way. In certain implementations a sensor network 106 can be integrated in order to provide additional functionalities and data (e.g., speed sensors, weight, alarm, etc.). Such sensors can also be used for improvements (such as: speed measurement, balance, etc.). Additionally, by incorporating a communication module 104, e.g., a WiFi module (e.g., within the robotic platform) data from the object/platform can be collected and transmitted to cloud services, such as in order to manage data from different platforms that also integrate the same, similar, and/or compatible technologies.

In certain implementations, the robotic platform can also include one or more motors 114A, 114B, wheels and batteries as well as an electrical circuit 116 which can be based on a physical motion charging electronics (like dynamo). Accordingly, when activated (e.g., by the user), the battery can be charged by pulling the robotic platform and spinning the motorized wheels.

In certain implementations, the robotic platform can also be configured with various ports/interfaces (e.g., USB) that can enable connected (e.g., laptops, tablets, smartphones, etc.) to charge via the robotic platform power supply.

In certain implementations, various electronic components of the platform (e.g., PCB, sensors etc.) can be coated or sealed (e.g., by adding materials like sealing rubber around the grooves and platforms connection points, such as plastic parts, screws, motors connection and more) the platform can be configured to be waterproof. Additionally, in certain implementations, by adding suspension springs between the motors and the wheels and between the platform and the luggage case and by padding the electronics inside the platform, the object/platform can be configured to be fall and/or shock-resistant. The electronics components can also be configured to withstand extreme weather conditions including humidity, high and low temperature and more. In doing so, the platform can be used in indoor and outdoor locations in different temperatures and climates. By adding springs and shock resistant mechanism(s) to the platform, it can be configured to handle/overcome uneven surfaces and obstacles (such as pavements, stones, gaps, etc.) both in "follow me" and manual modes.

In certain implementations, the robotic platform can be configured to enable 360-degree pivot and long distance communication. For example, HC-06 \HC-05 Bluetooth module based on SPP (Serial Protocol over Bluetooth) can be integrated within the robotic platform in order to enable it to communicate with the user device (and/or other device (s)), even at significant distances (e.g., a range of up to 60 meters).

In certain implementations, the platform can be designed/configured to enable the changing of motors and batteries easily. Additionally, various configurations of the platform can enable it to move at a variety of speeds, carry variety of loads and/or operate for longer durations. In one exemplary configuration, the platform can integrate two DC gearbox motors (12V, 15 kg·cm torque, 300 RPM), a 12V 5 ah battery and 10 cm diameter wheels. Such a configuration of the platform can enable it to carry up to 12 kg and travel at a speed of 0-7 km/h for 1 working hour.

As noted above, it should be understood that the robotic platform can be activated remotely e.g., by an appropriately configured wearable device (e.g., one that includes an app that enables communication between the device and the platform).

In certain implementations, various computer vision techniques (such as those described and/or referenced herein), such as those executing on the robotic platform, can enable recognition of various items, places, people, etc. This data can be uploaded to the cloud and synced with relevant businesses databases. In doing so, various learning techniques can be employed and thereby offer important data to businesses and provide offers to the users (e.g., through our app). It should also be noted that the robotic platform can also be implemented in various environments (e.g., supermarkets, airports, streets etc.). The referenced computer vision techniques enable the platform to learn the environment and provide valuable data.

For example—a shopping cart at the supermarket that integrates the robotic platform can integrate techniques that can process and determine a user's habits (e.g., in real time) and also generate and provide offers, e.g., of products complementary to the ones that he has already chosen (e.g., by sending the offer to the user's device, e.g., within the app referenced herein and/or a third party app). In certain implementations the shopping cart can also be configured to lead the user to a product that he is looking for (e.g., using the techniques described herein).

Another exemplary implementation of the technologies described herein is a traveler's luggage that integrates the robotic platform. In such an implementation the described computer vision techniques can generate and provide notifications to the user according to his interests, as determined from the surrounding environment (like businesses at the airport). Such technologies also enable businesses that are proximate to the user to recognize a potential customer in their area.

In certain implementations, the described navigation and mapping techniques (indoors and outdoors) can be employed in conjunction with technologies like: GPS, Beacon, Wifi etc. whereby objects that integrate the platform can map their surrounding area(s) and provide such data to the 'cloud' (such data may reflect, for example, space, structure, shops, obstacles, etc.) this data can be synced with other users. In doing so, the functionality of each respective object/platform can be enhanced, such as via the sharing of the referenced contextual data.

In certain implementations, the robotic platform can be configured with respect to a new or existing object, thereby enabling the object/platform to communicate, avoid obstacles and locate and follow the user and the user's smartphone.

For example, the platform can be implemented in a luggage, bag, a cart (e.g., shopping, airport, warehouse, construction, hospital carts, etc.), vehicles, furniture, motorized machines (e.g., lawn mowers, cleaning machines), boxes (e.g., toolbox, packages etc.) and other objects.

In certain implementations, in order to enable use of the luggage in a manual mode, the object/platform can incorporate an adjustable handle whose height and angle can be adjusted. The handle can be connected to an axis that is located on the external part of the luggage. This allows the user to easily maneuver the luggage while using the manual mode (for charging the battery or just for carrying).

In certain implementations, the luggage can also include a built in drawing surface 608, tablet holder 610, lightning, etc.

In one exemplary implementation of the described technologies (e.g., the described platform and accompanying app), the robotic platform can be installed from the inside of the luggage and 2 DC motor pins can stand out from the luggage with 2 wheels connected to them (as shown in the accompanying figures). On the front side of the luggage can be a control panel, a USB charger 612, on\off button and a sensor network which can be for obstacle detection and avoidance (as described herein and shown at FIG. 6). As described, the luggage can be used by the user in 2 main modes; "Follow me" mode and manual mode.

In 'Follow me' mode the user can choose when to turn on the robotic luggage. When turned on, the robotic platform that is integrated from the inside is activated (e.g., the battery 112 powers up the microcontroller\CPU 108, sensors and the software is activated as well).

The Luggage (e.g., the platform) then awaits BLE (Bluetooth low energy) connectivity from the user's device (e.g., smartphone. Upon activating an accompanying app at the smartphone, the smartphone and the luggage (e.g., the platform) can be connected via Bluetooth communication.

Figure 11:
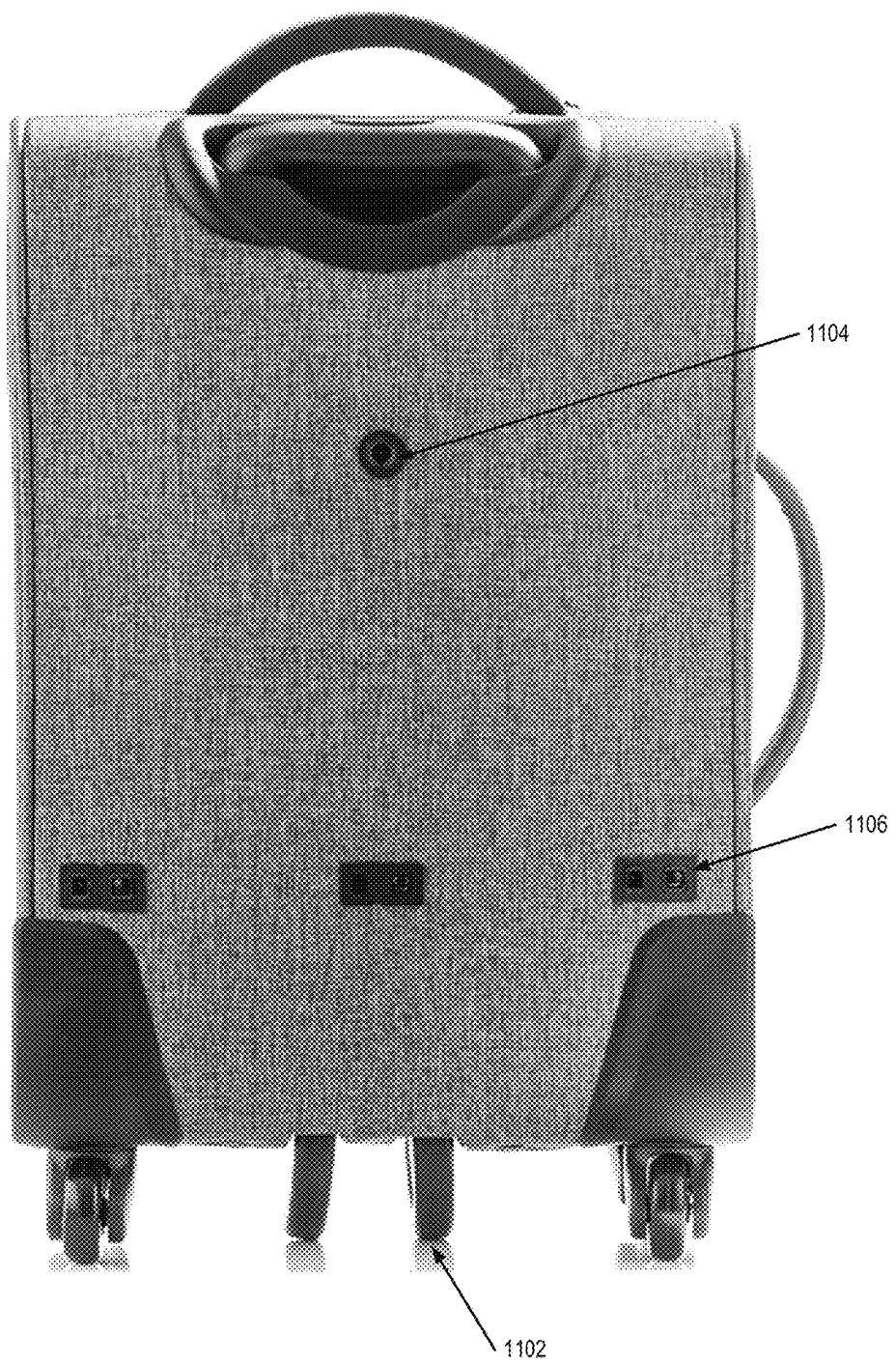
FIG. 11 depicts an exemplary implementation of a robotic platform in accordance with one implementation of the present disclosure.

FIG. 11 depicts another example of an object that has a robotic platform inside. As shown in FIG. 11, on the bottom are 2 motorized wheels 1102, centered circle is a camera 1104 and IR proximity sensors 1106 on the bottom (inside are various additional components, hardware, etc., described herein).

The UI menu on the app can allow the user to turn the "follow me" function on off and to choose which data he wants to receive from the luggage sensors to his smartphone (photos, battery life, location, etc.).

When the "follow me" function is activated, the various techniques described herein can be employed (e.g., at the device and/or the platform). The luggage can await data input from the user's smartphone and the app can determine/extract the current angle of the device based on inputs originating from the device's sensors (e.g., gyroscopes and compass) and transmit these value(s) to the luggage side.

Upon receiving the referenced data, the luggage can calibrate itself (based on corresponding inputs from sensors integrated within the platform) by motion to a point where the luggage and the user's smartphone are facing to the same direction with the same relative angle (thereby calibrating the position of the luggage and the device).

The app executing on the user's smartphone can then extract data from sensors of the user's device (e.g., accelerometer) in order to determine the user's motion (e.g., based on the user's steps which may reflect gentle movements that are limited by a specific threshold).

The number of step motions can be counted (e.g., in a given period of time), and this data can be sent to the robotic luggage side.

The luggage side receives this data—if there are no steps detected the luggage may not move. If steps are detected, motion of the luggage can be initiated.

In starting the 'following' process, the luggage can check for obstacles first. In one exemplary implementation, 6 ultrasonic sensors (2 in the front, 1 on each side and 2 on the back) and 2 IR sensors 606 facing to the floor and a camera can be used.

Figure 6:
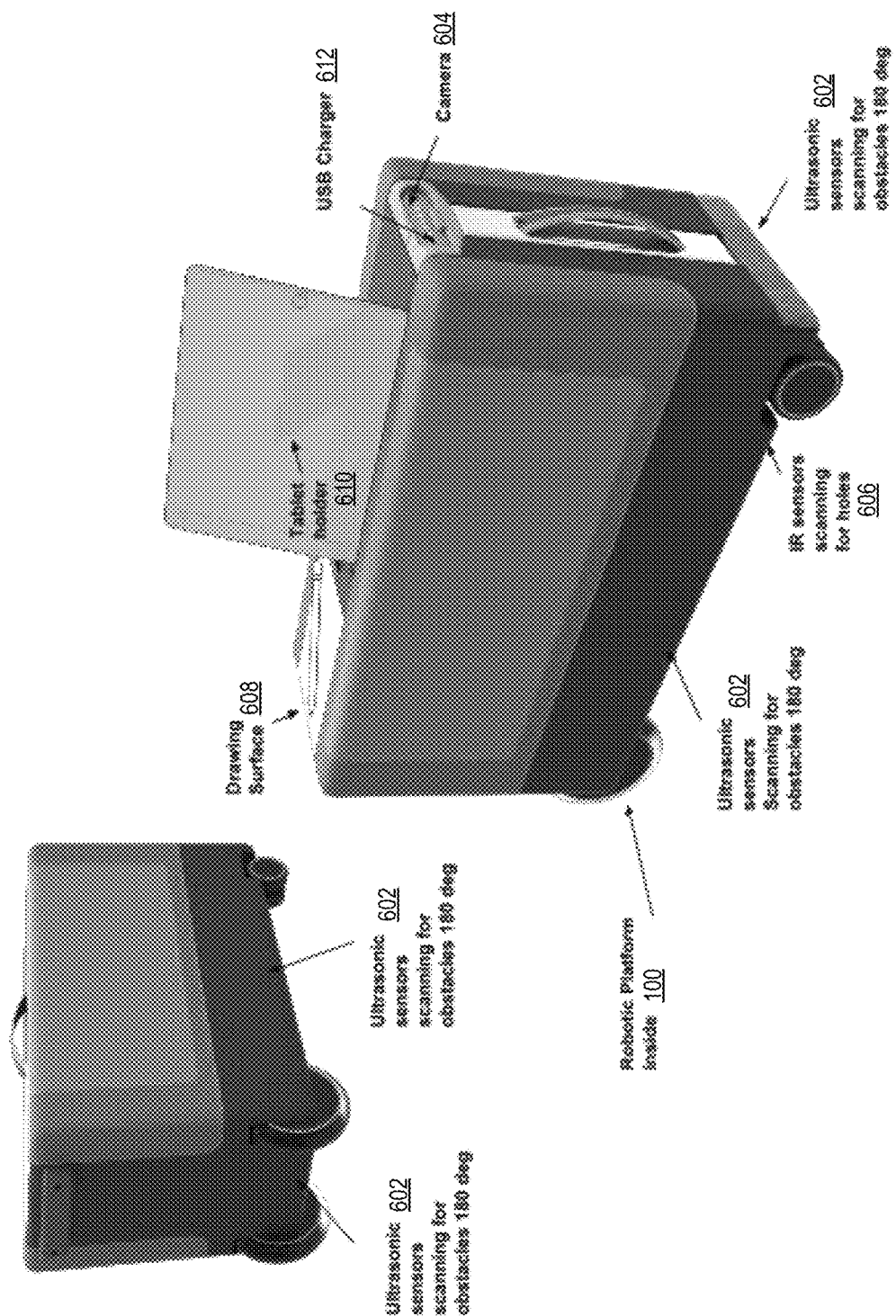
FIG. 6 depicts an exemplary implementation of a robotic platform in accordance with one implementation of the present disclosure.

The ultrasonic sensors (e.g., sensors 602 as shown in FIG. 6 which depicts an exemplary implementation of the platform in a luggage context) can be configured to check for obstacles in front of the luggage (e.g., in a specified distance). If an obstacle is detected, the camera 604 can capture a snapshot and the image can be processed (e.g., using an "image growing" technique) to determine the size of the obstacle. In doing so, one or more techniques can be initiated to determine one or more routes (e.g., an optimal route) to avoid the obstacle. Upon determining such a route, commands to move the platform/object (i.e., the luggage) can be generated and transmitted to the motor's driver 118. The luggage can thus move while sensing and "seeing" the obstacle until the way is clear.

Upon determining that the luggage is moving with a clear path in front of it, the luggage receives the relative angle and amount of steps from the app executing on the user's device and the platform can generate and send corresponding commands to the control system. For example, upon determining that the user has turned in a particular direction, the luggage can also turn in the given angle in order to maintain alignment with the user's device. The luggage can also adjust its speed according to the amount of steps that were made in a defined period of time in order to maintain proximity to the user, the luggage will follow the user's route, as described herein.

At various intervals (e.g., every few iterations) the camera can turn on in order to take a snapshot and process it in order to locate the user. Additionally, the current data from the respective gyroscopes of the user device and the platform can be used to enable the camera to focus the search in a specific area (e.g., based on the angle differentiation between the device and the platform). The image processing techniques applied to the image can enable the determination/approximation of the user's position and can be used to correct the position of the luggage if there was a drift or after an obstacle avoidance. Additionally, the described computer vision techniques can enable the luggage to re-position to a specific point relative to the user (for example: from his left side, right side, in front etc.). In certain implementations the default following mode may be from the user's side but the user can change that and choose different positions for the "follow me" mode using the re-position function on the app.

The camera on the platform can also be configured to take a snapshot when an obstacle is detected in order to determine its dimensions. The camera is also capable of taking snapshots and videos according to the user's preferences and can further obtain data from the surrounding environment, e.g., in order to extract data for the user using computer vision techniques, such as those described herein. The combination of the disclosed sensors network and computer vision techniques provides a robust following system that can re-position itself and fix drifts by using the techniques described herein.

In "manual mode" the user can choose to pull the luggage manually whenever he wants by releasing the front manual handle. An on\off button allows the user to activate electrical charging. When activated, the motorized wheels can rotate while the luggage is pulled and the motors can produce a magnetic field while rotating, thereby producing a current that charges the battery that is inside the platform.

Figure 2:
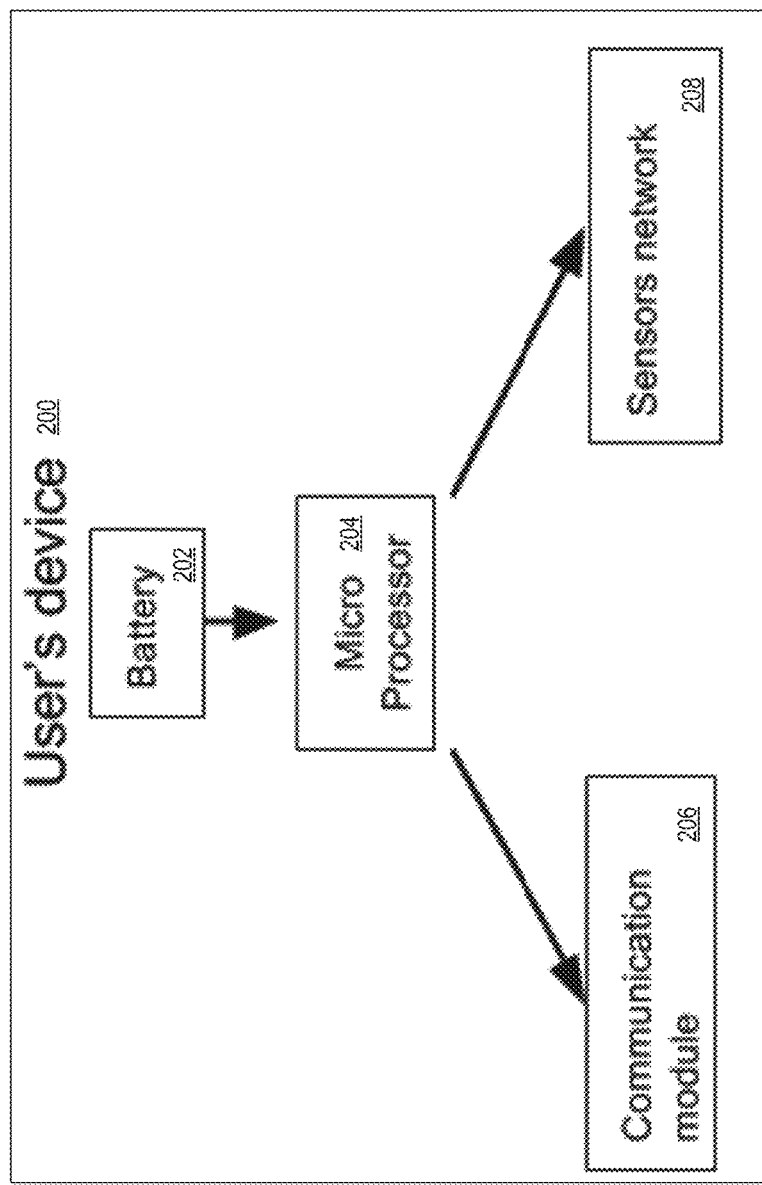
FIG. 2 depicts an exemplary implementation of a device in accordance with aspects and implementations of the present disclosure.

The accompanying figures depict various exemplary aspects of the described technologies, including:

FIG. 2 depicts one exemplary implementation of a user device 200 which can include battery 202, microprocessor 204, communication module 206 and/or sensor network 208, such as is described herein.

Figure 3:
FIG. 3 depicts an exemplary robotic platform in accordance with various implementations of the present disclosure.

FIG. 3 depicts an exemplary robotic platform such as is described herein. The robotic platform 300 can be connected to an object with motorized wheels 302 in order to allow it follow, communicate and avoid obstacles. Various components that are described herein, e.g., in FIG. 1 can be integrated inside the platform.

Figure 4:
FIG. 4 an exemplary implementation of a robotic platform in accordance with one implementation of the present disclosure.

FIG. 4 depicts an exemplary implementation of the robotic platform, showing the platform integrated with the luggage (the rear wheels are connected to the platform).

Figure 5B:
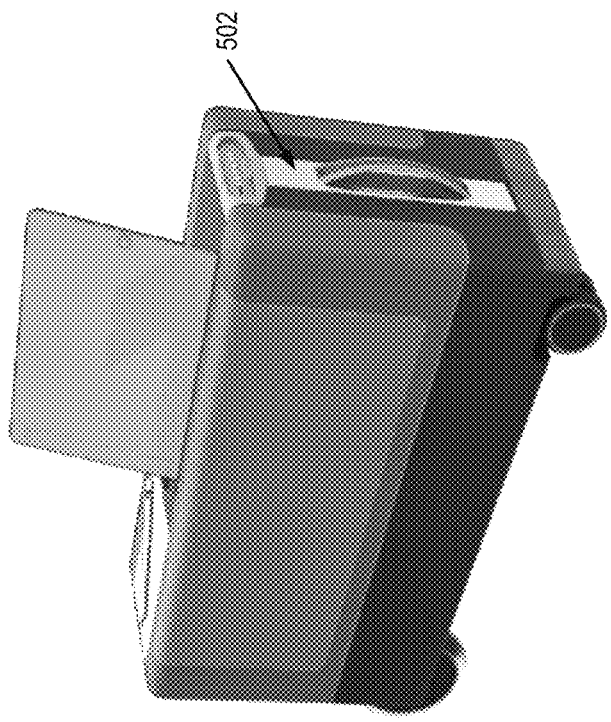
FIGS. 5A-5B depict an exemplary implementation of a robotic platform in accordance with one implementation of the present disclosure.
Figure 5A:
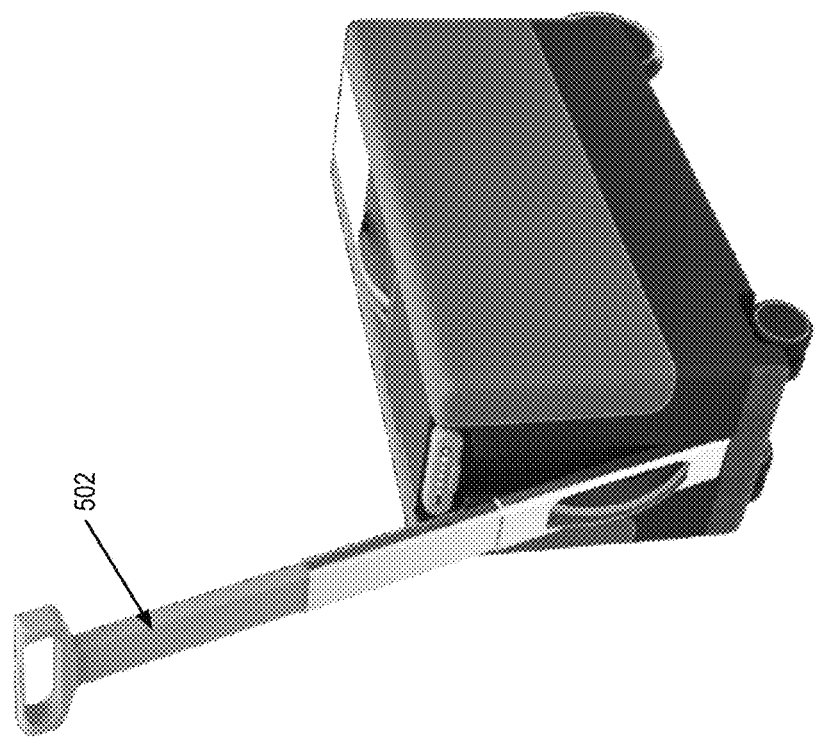

FIGS. 5A and 5B depict an exemplary implementation of the adjustable handle mechanism 502, as described herein.

As noted, in certain implementations the described robotic platform can be integrated and designed into a piece of luggage, shopping cart, airport trolley, bag, etc.

Figure 9:
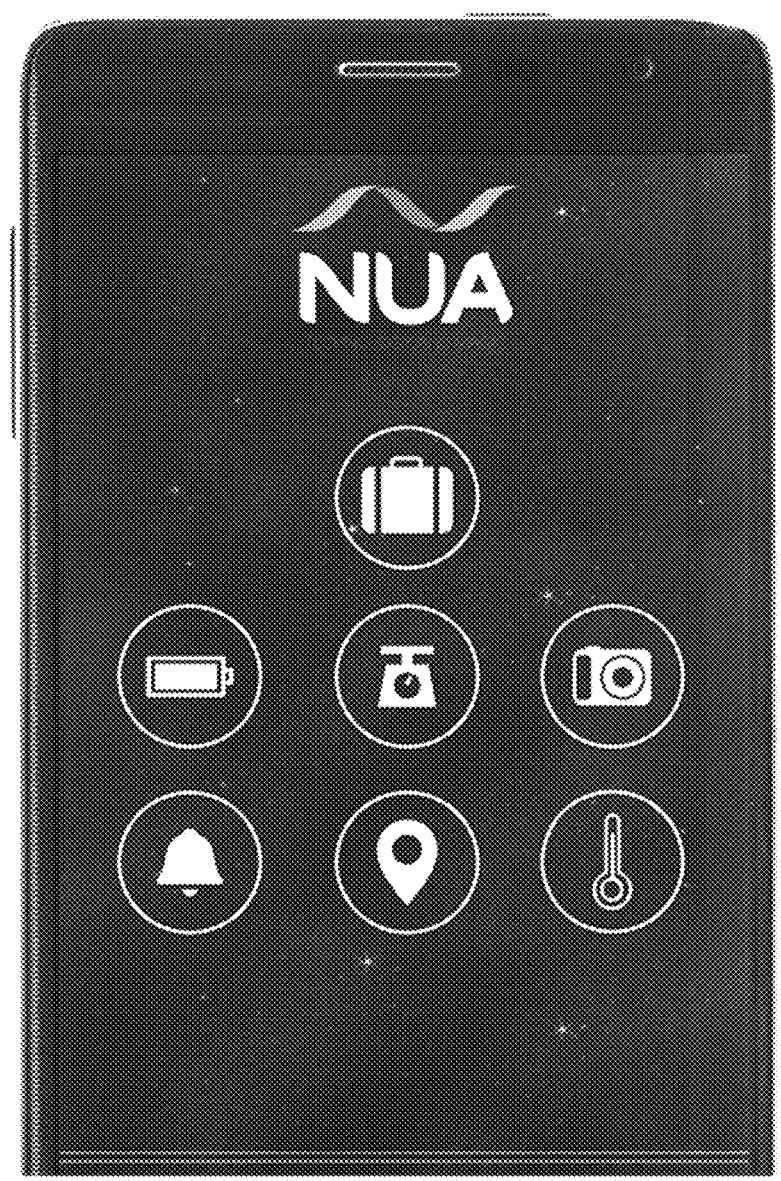
FIG. 9 depicts an exemplary user interface in accordance with aspects and implementations of the present disclosure.

In certain implementations, the described platform can operate in conjunction with a connected device and/or application. For example, the user can open an associated application ('app') on a device (e.g., smartphone, etc.), such as by launching the app directly or by tapping his phone on the luggage which can include an internal sticker/badge etc. that can communicate with his smartphone using communication technology such as—NFC, RF, etc. The tapping can open the associated platform control app on the user's smartphone allowing a much faster and easier interaction with the robot. An exemplary interface of the referenced app is shown in FIG. 9.

The user will stand by the platform, luggage, etc., and can press the "Follow Me" button on his app (then the robot's camera/cameras can identify the specific user). One option is finding a person that holds a smartphone in the near field other option is transmitting IR beam from the smartphone that can be recognized by the robot, another option is standing in the front/back side of the robot, after the user presses the "Follow Me" button the various sensors on the platform, luggage, etc. can look for a close shape that is structured as the possible user (recognizing legs, clothing, shoes, etc.), thereby giving a certain degree of probability that the person in front the robot is the user. The robot can send the user the recognized photo and the user can approve (e.g., via the app) that the person on the picture is the real person that the robot should follow. Then the robot can take a photo/short video of the user and build a profile/database that is stored in its internal memory.

The database can include: user's clothes color (e.g., using RGB or other data that might be produced from different images using different cameras)—for example the described technologies can calculate the hue and the saturation of each RGB pixel, shape (such as: user's pants diameter, legs width, height and more), user's heading azimuth based on data that is sent from the user's smartphone (for example by extracting the internal gyro data), Bluetooth/Bluetooth low energy RSSI that can be transformed into distance measurement, and the user's smart device (such as smartphone) will send accelerometers data from the smart device to the robot, so the robot will be able to detect the user's motion and speed.

In certain implementations, upon determining an environmental change (such as lightning, hiding, obstacle and more) the described technologies can sample the change in the lightning conditions and apply it on the elements that are stored in the database in order to project/predict how these parameters are likely to look under the current light conditions (on the next step the described technologies can attempt to match the current camera shot/video stream (real time) to the stored data that was taken at the beginning of the process, after using an algorithm that applies the changed lightning conditions on the stored data). The described technologies can utilize the described data that is mentioned above (azimuth, acceleration, BT RSSI, Vision, etc.) to generate a statistical decision of where the user is positioned currently or where are the biggest chances to find him, that will reduce the running time of the algorithm and will allow fluid "follow me" function. When the match is determined the robot can move on that direction. If the robot senses low light/dark conditions it can send an alert to the smart device (using communication protocol, such as: serial BT protocol), and the referenced app can automatically activate all/part of the smart device transmitters such as IR beam, Ultrasonic sounds, BT RSSI etc. This fusion can allow the robot to keep the "follow me" motion by using triangulation or other methodologies.

The robot can make a pivot turn until he recognizes the user. The decision on which way to turn can be based on the last location that the user has been seen at, for example: if the user disappeared from the right side of the frame the robot can turn right to look for him.

In certain implementations, if the user can't be found by the camera, the described technologies can re build the user's path by using the gyros and accelerometers (heading angle and speed) data that is stored in the database and was sent from the user's smartphone. For example, the robot can use a motion control algorithm that is based on algorithms such as: PID, that enable the calculation of speed and direction, by using its internal sensor arrangement such as: compass, IMU (BOSCH BNO055), MPU or other, the described technologies can detect which direction he is heading and what is the differential angle/azimuth relative to the user's smartphone and fix its route accordingly.

By re building the user's path (speed and angle) combined with computer vision that can recognize the user, the described technologies can use a statistical algorithm that allows the robot to find the user in different environments under different environmental conditions, thereby reducing searching time, expensive and complicated hardware and electronics and changing the way robots interact with humans and with the environment.

Whenever there is a hiding/obstacle, the robot can use its proximity sensors and camera to detect an obstacle including its distance from the robot and its width (by using algorithms such as: image growing, IR distance, Ultrasonic distance). This data can allow the robot to compute the best decision and shortest path to avoid the obstacle and the shortest way to keep tracking the user based on gyros, Accelerometers and cameras data.

The robot is also able to connect via Wifi, 3G, etc. to the database of a specific facility (such as: supermarket, airport, warehouse and more) and navigate around, for example by getting a map (that will be transferred by the facility or by another robot that has already mapped this specific area through the internet) the robot can alert the user upon his preferences and guide him in this environment. For example: a shopping cart can navigate inside the supermarket and lead the user to a specific product/list of products that the user has inserted into the cart's menu. Or if the user likes a specific brand and would like the robot to find and take him to a specific brand shop, the robot can navigate straight to the shop by using the map or by image recognition—if the luggage will recognize the logo/name of this brand it will send the user alert. This can allow facilities to understand the user better and offer them a better experience based in their preferences which can be shared from the referenced database and real time navigation in their facility.

The built in camera/cameras can also serve the user/facility for different purposes, such as: security, real time video, taking photos and more. For example, the robot can be configured to look for specific word, logo, person and more and can send an alert/data to the device/person etc. that has requested it. In addition, it can be configured to navigate by itself to different locations within the facility or outside (using internal navigation capabilities computer vision, mapping, accelerometers and gyros and GPS, 3G and more on the outdoors).

In addition, the user can charge the internal battery by carrying the luggage manually, the motors inside can create a magnetic field and by using an electrical circuit (like dynamo) the battery will be charged, and receive more data from built in sensors such as: weight, location, temperature, snapshots, videos and more.

By way of further illustration, when the user presses the "Follow Me" button, the referenced app can start to run on the background of the user's smart device. One option is that the algorithm will extract data from the user's smart device built in sensors such as; Gyros, Accelerometers and Camera.

The Gyros data be an x,y,z vectorial representation of the smartphone's position. Using vector matrix transform method the algorithm can make sure that no matter what the smartphone's position is, the perpendicular vector to the user's front body side will be calculated. In addition, the algorithm can detect the smartphone's angular change and store the angle in its data base, meaning that we have the user's heading vector and angular changes.

Figure 10B:
FIGS. 10A-B depict aspects of operation of a device in accordance with aspects and implementations of the present disclosure.
Figure 10A:
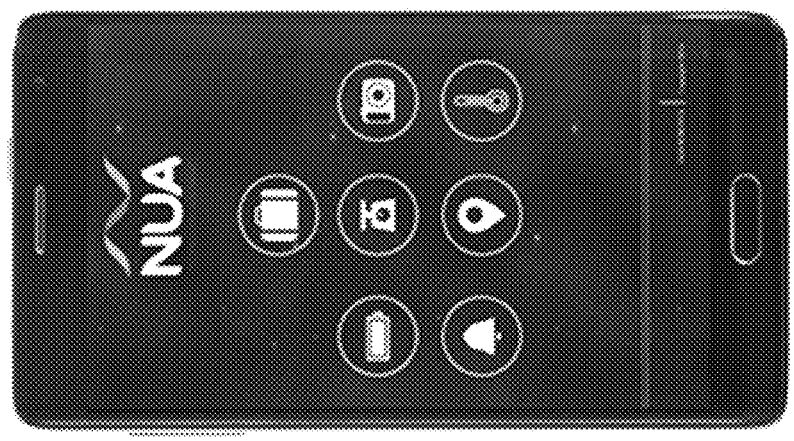

FIGS. 10A and 10B depict the user device at various angles. It should be understood that, using the described technologies, no matter how the smartphone is positioned, the heading vector stays the same (same for any other multi-dimensional change) by using mathematical calculation that makes sure that the heading vector stays the same regardless to the new position. For example, when the user starts the process his current heading vector is known/can be determined, and this can be the reference point such that each change in the smartphone's position (the user might put it in his front/back pocket, talk, put it in his bag etc.) won't matter as the mathematical formula can ensure that the x,y,z values are calculated to represent the heading vector (user's front body side).

For example if the user holds the phone by his ear, with a 45 degree tilt the algorithm can calculate the current x,y,z values and the user's heading vector which is be based on the heading vector (perpendicular to his from side body) and the angular change—meaning which way and what is the turning angle of the robot should be to keep tracking.

With respect to the accelerometer data, the described technologies can be configured to recognize user motion by extracting and analyzing the built in accelerometer data, and the algorithm defines an up and low thresholds that represents walking. The low threshold can be configured to eliminated "noise" so it won't be interpreted as walking and the high threshold can prevent wrong interpretation as well (for example the user moved the phone very fast), the algorithm can define when the user made a step, count it and transform it into an average speed. In certain implementations, in each time interval the phone can transfer the user's speed.

In addition, in certain implementations the app can offer the user purchase/service options regarding the facility that he is in. For example: if the user is located in an airport, the smart phone can connect to a local database/Wifi/3G etc. network and offer the user products/services based on his location—sales, proffered brands, restaurants and more. Another example is receiving suggestions for complementary products while using the device in a supermarket, the store can receive get the user's shopping list and the cart can lead the user across the facility in a planned route (that will be planned by the robot that is connected to the local data base), that will allow the store to offer the user complementary products and plan a route that potentially will increase the stores profit and will expose the user to products/sales that he wasn't aware of (this example is relevant for shopping malls, airports, supermarkets and more).

Another option is that all the data to be processed from the robot's side can be stored on the robot's side and can be transferred to the user's smartphone by Bluetooth, Wifi, 3G or other communication channel and the data will be processed by the user's smartphone. Doing so can allow to reduce costs by choosing cheaper hardware (processor, memory, etc.) from the robot's side, for example a picture will be taken by the camera and transmitted to the smartphone and the computer vision algorithm will run on the user's smartphone and the final commands will be sent back to the robot (turn right/left at X speed, avoid the obstacle from the left, etc.). The idea is that all the "heavy" calculations will be done by the user's device processor. In doing so, the relevant data can be transmitted to the robot, and will be interpreted by him into physical command(s).

Additionally, in certain implementations the data which needs to be processed by the robot: image processing, computer vision, sensors input, etc., can be compressed and sent via communication tech such as: Bluetooth, ZigBee, RF, etc. to the user's smartphone and the data can be processed by the user's smart device instead of on the robot's MCU/CPU and the final decision regarding which way to move (follow or avoid obstacles or any other decision) will be sent to the robot. Doing so enables reduction in the costs of the robot's hardware and electronics and reduce required calculation power.

Figure 8:
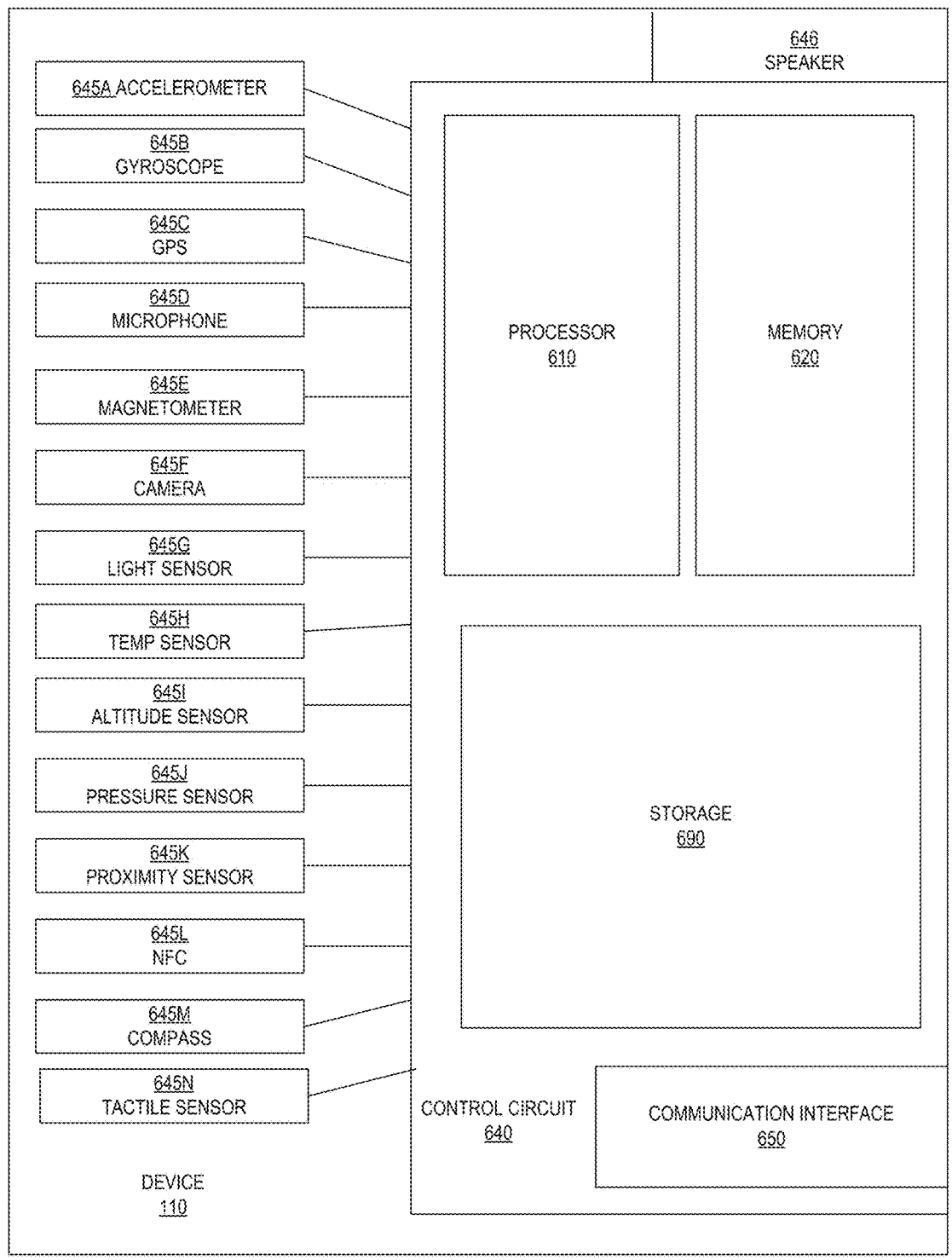
FIG. 8 depicts an exemplary implementation of a device in accordance with aspects and implementations of the present disclosure.

It should also be noted that, in certain implementations, various devices and platforms described and/or referenced herein can also include and/or incorporate various sensors and/or communications interfaces. Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface. NFC interface, etc. By way of illustration, FIG. 8 depicts one exemplary implementation of a user device 110. As shown in FIG. 8, device 110 can include a control circuit 640 (e.g., a motherboard) which is operatively connected to various hardware and/or software components that serve to enable various operations, such as those described herein. Control circuit 640 can be operatively connected to processor 610 and memory 620. Processor 610 serves to execute instructions for software that can be loaded into memory 620. Processor 610 can be a number of processors, a multi-processor core, or some other type of processor, depending on the particular implementation. Further, processor 610 can be implemented using a number of heterogeneous processor systems in which a main processor is present with secondary processors on a single chip. As another illustrative example, processor 610 can be a symmetric multi-processor system containing multiple processors of the same type.

Memory 620 and/or storage 690 may be accessible by processor 610, thereby enabling processor 610 to receive and execute instructions stored on memory 620 and/or on storage 690. Memory 620 can be, for example, a random access memory (RAM) or any other suitable volatile or non-volatile computer readable storage medium. In addition, memory 620 can be fixed or removable. Storage 690 can take various forms, depending on the particular implementation. For example, storage 690 can contain one or more components or devices. For example, storage 690 can be a hard drive, a flash memory, a rewritable optical disk, a rewritable magnetic tape, or some combination of the above. Storage 690 also can be fixed or removable.

A communication interface 650 is also operatively connected to control circuit 640. Communication interface 650 can be any interface that enables communication between user device 110 and one or more external devices, machines, services, systems, and/or elements (including but not limited to those depicted in FIG. 1 and described herein). Communication interface 650 can include (but is not limited to) a modem, a Network Interface Card (NIC), an integrated network interface, a radio frequency transmitter/receiver (e.g., Bluetooth, cellular, NFC), a satellite communication transmitter/receiver, an infrared port, a USB connection, or any other such interfaces for connecting device 110 to other computing devices, systems, services, and/or communication networks such as the Internet. Such connections can include a wired connection or a wireless connection (e.g. 802.11) though it should be understood that communication interface 650 can be practically any interface that enables communication to/from the control circuit 640 and/or the various components described herein.

At various points during the operation of described technologies, device 110 can communicate with one or more other devices, systems, services, servers, etc., such as those depicted in the accompanying figures and/or described herein. Such devices, systems, services, servers, etc., can transmit and/or receive data to/from the user device 110, thereby preferably enhancing the operation of the described technologies, such as is described in detail herein. It should be understood that the referenced devices, systems, services, servers, etc., can be in direct communication with user device 110, indirect communication with user device 110, constant/ongoing communication with user device 110, periodic communication with user device 110, and/or can be communicatively coordinated with user device 110, as described herein.

Also preferably connected to and/or in communication with control circuit 640 of user device 110 are one or more sensors 645A-645N (collectively, sensors 645). Sensors 645 are various components, devices, and/or receivers that can be incorporated/integrated within and/or in communication with user device 110. Sensors 645 can be configured to detect one or more stimuli, phenomena, or any other such inputs, described herein. Examples of such sensors 645 include, but are not limited to, an accelerometer 645A, a gyroscope 645B, a GPS receiver 645C, a microphone 645D, a magnetometer 645E, a camera 645F, a light sensor 645G, a temperature sensor 645H, an altitude sensor 645I, a pressure sensor 645J, a proximity sensor 645K, a near-field communication (NFC) device 645L, a compass 645M, and a tactile sensor 645N. As described herein, device 110 can perceive/receive various inputs from sensors 645 and such inputs can be used to initiate, enable, and/or enhance various operations and/or aspects thereof, such as is described herein.

At this juncture it should be noted that while the foregoing description (e.g., with respect to sensors 645) has been directed to user device 110, various other devices, systems, servers, services, etc. (such as are depicted in the accompanying figures and/or described herein) can similarly incorporate the components, elements, and/or capabilities described with respect to user device 110. It should also be understood that certain aspects and implementations of various devices, systems, servers, services, etc., such as those depicted in the accompanying figures and/or described herein, are also described in greater detail below in relation to FIG. 7.

It should also be understood that the components referenced herein can be combined together or separated into further components, according to a particular implementation. Additionally, in some implementations, various components of a particular device may run on separate machines. Moreover, some operations of certain of the components are described in more detail herein with respect various examples, illustrations, methods, and processes.

Described herein are various aspects of a method for configuring a robotic platform to identify obstacles and follow a user device. The method is performed by processing logic that may comprise hardware (circuitry, dedicated logic, etc.), software (such as is run on a computer system or a device such as those described herein), or a combination of both. In one implementation, the method is performed by one or more components depicted in the accompanying figures, while in some other implementations, one or more operations may be performed by other machine(s).

For simplicity of explanation, methods are described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

It should also be noted that while the technologies described herein are illustrated primarily with respect to identifying obstacles and following a user device, the described technologies can also be implemented in any number of additional or alternative settings or contexts and towards any number of additional objectives. It should be understood that further technical advantages, solutions, and/or improvements (beyond those described and/or referenced herein) may be enabled as a result of such implementations.

Figure 7:
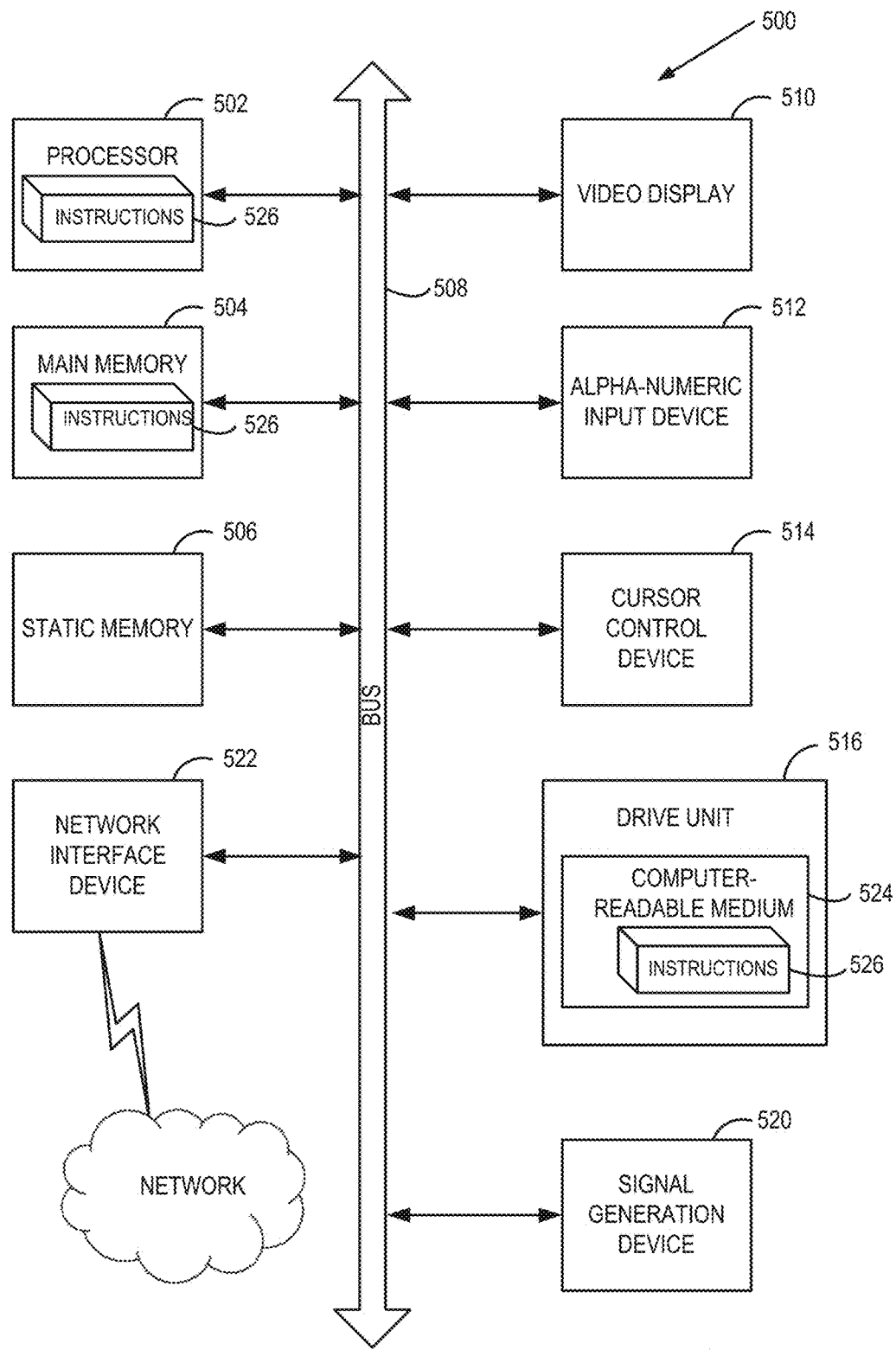
FIG. 7 depicts a block diagram of an illustrative computer system operating in accordance with aspects and implementations of the present disclosure.

FIG. 7 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, robotic platform, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions executed by collaboration manager 225, etc.) embodying which may embody any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "requesting," "correlating," "selecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. In certain implementations, this apparatus may be specially constructed for the required purposes. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It should be understood that the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to those referenced herein. The scope of the disclosure should, therefore, be determined with reference to the appended claims, along with the full scope of equivalents to which such claims are entitled.

What is claimed is:

1. A method comprising:
   receiving one or more sensor inputs;
   processing, by a processing device, the one or more sensor inputs to identify an obstacle within a navigation path, the navigation path corresponding to a robotic platform following a user device, wherein processing the one or more sensor inputs comprises:
   sampling a change in light condition;
   applying the sampled change to one or more stored elements to project a current appearance of an object; and
   matching, in view of the projection, at least one of the one or more sensor inputs to at least one of the one or more stored elements;
   computing an alternate route in view of the navigation path and the identification of the obstacle; and
   configuring the robotic platform to follow the user device based on the alternate route.

2. A system comprising:
   a memory; and
   a processing device, operatively coupled to the memory, to:
   receive one or more sensor inputs;
   transmit the one or more sensor inputs to an external device that synchronizes and processes the one or more sensor inputs with external data and generates new data in view of the synchronization and processing;
   receive the new data from the external device;
   process the one or more sensor inputs in view of the new data to identify an obstacle within a navigation path, the navigation path corresponding to a robotic platform following a user device;
   compute an alternate route in view of the navigation path and the identification of the obstacle; and
   configure the robotic platform to follow the user device based on the alternate route.

3. A non-transitory computer readable medium having instructions encoded thereon that, when executed by a processing device, cause the processing device to:
   receive one or more sensor inputs;
   transfer the one or more sensor inputs to an external device that processes the one or more sensor inputs to:
   identify an obstacle within a navigation path, the navigation path corresponding to a robotic platform following a user device;
   compute an alternate route in view of the navigation path and the identification of the obstacle;
   provide the alternate route to the robotic platform;
   configure the robotic platform to follow the user device based on the alternate route;
   generate new data based on a user's preferences;
   process the sensor inputs in view of the new generated data; and
   share the inputs and the new data with another device to create new functionalities.

4. The method of claim 1, wherein the robotic platform comprises a component
   that is attachable to an item and configured to physically maneuver the item.

5. The method of claim 1, further comprising:
   receiving an input from the external system which includes mapping data of the location of the robotic platform;
   constructing a navigation route based on the received input; and
   activating a motion control module to physically guide a user to a specified location.

6. The method of claim 1, wherein the inputs comprise wireless inputs from an external device.

7. The method of claim 1, further comprising re-positioning the robotic platform, based on an input received from a device that transmits data to the robotic platform.

8. The method of claim 1, wherein the robotic platform includes a circuit that charges based on manual physical motion charging.

9. The method of claim 1, further comprising: in response to an inability to locate a user, re-constructing the navigation path using stored data collected by another device and received by the robotic platform.

10. The method of claim 1, further comprising automatically activating a transmitter of the robotic platform that enable the robotic platform to function in low light conditions while receiving directing signals from another device.

11. The system of claim 2, wherein the data that was sent from the robotic platform to the external system is provided to other devices to provide them new functionalities to such devices.

12. The system of claim 2, wherein the robotic platform receives inputs from an external system, wherein the received inputs change existing functionalities of the robotic platform.

13. The system of claim 2, wherein the processing device is further configured to:
receive an input from the external device which includes mapping data of the location of the robotic platform,
construct a navigation route based on the received input, and
activate a motion control module to physically guide a user to a specified location.

14. The system of claim 2, processing device is further configured to:
generate new data based on a user's preferences,
process received sensor inputs in view of the new generated data, and
share the received inputs and the new data with another device to create new functionalities.

15. The non-transitory computer readable medium of claim 3, wherein data is received from an external system, wherein the data changes existing functionality of the robotic platform.

16. The non-transitory computer readable medium of claim 3, wherein the processing device is further to:
maps surroundings of the robotic platform,
constructs potential routes based on the mapped surroundings, and
shares the potential routes with other devices.

17. The non-transitory computer readable medium of claim 3, wherein the robotic platform comprises a component that is attachable to an item and configured to physically maneuver the item.

18. The non-transitory computer readable medium of claim 3, wherein the robotic platform receives inputs that add functionalities to the robotic platform.

19. The non-transitory computer readable medium of claim 3, further comprising automatically activating a transmitter of the robotic platform that enable the robotic platform to function in low light conditions while receiving directing signals from another device.

* * * * *